(12) United States Patent
Strasser et al.

(10) Patent No.: US 8,814,441 B2
(45) Date of Patent: Aug. 26, 2014

(54) OPTICAL CONNECTOR

(75) Inventors: Martin Michael Strasser, Herisau (CH); Daniel Greub, St. Gallen (CH)

(73) Assignee: Huber+Suhner AG, Herisau (CH)

( * ) Notice: Subject to any disclaimer, the term of this patent is extended or adjusted under 35 U.S.C. 154(b) by 365 days.

(21) Appl. No.: 12/450,973

(22) PCT Filed: Apr. 16, 2008

(86) PCT No.: PCT/EP2008/054615
§ 371 (c)(1),
(2), (4) Date: Oct. 20, 2009

(87) PCT Pub. No.: WO2008/128940
PCT Pub. Date: Oct. 30, 2008

(65) Prior Publication Data
US 2010/0111477 A1    May 6, 2010

(30) Foreign Application Priority Data

Apr. 20, 2007 (CH) ......................... 652/07

(51) Int. Cl.
*G02B 6/38* (2006.01)
(52) U.S. Cl.
USPC ......................................... 385/56
(58) Field of Classification Search
USPC .................................. 385/56, 60
See application file for complete search history.

(56) References Cited

U.S. PATENT DOCUMENTS

| | | |
|---|---|---|
| 4,793,683 A | 12/1988 | Cannon, Jr. et al. |
| 5,195,904 A | 3/1993 | Cyvoct |
| 7,329,139 B2 * | 2/2008 | Benham .................. 439/352 |
| 2004/0223699 A1 | 11/2004 | Melton et al. |
| 2006/0183375 A1 | 8/2006 | Benham |

FOREIGN PATENT DOCUMENTS

| | | |
|---|---|---|
| CN | 87 1 03347 A | 1/1988 |
| DE | 2 353 004 | 10/1973 |
| EP | 0 491 626 A1 | 6/1992 |
| EP | 1 254 387 B1 | 8/2006 |
| EP | 1 783 524 A1 | 5/2007 |
| JP | 5-205813 | 8/1993 |
| JP | H6-2306 | 1/1994 |

OTHER PUBLICATIONS http:// www.lemousa.com/pdfs/catalog/USA/fiber_optic_catalog.pdf, LEMO USA Inc., "Lemo's Fiber Optic Connectors," Mar. 2003, pp. 5, 6 and 49-57.
Huber+Suhner, "ODC—Ein Verbinder for die harten Applikationen," ODC—A connector for the hard applications, Connectivity News Jan. 2007, pp. 10-11.

* cited by examiner

*Primary Examiner* — Sarah Hahm
(74) *Attorney, Agent, or Firm* — Pauley Petersen & Erickson

(57) ABSTRACT

An optical connector (10), in particular for outside use, for detachably connecting at least two optical cables along a connector axis (43) comprises a socket portion (11) and a plug portion (27), which portions are substantially of cylindrical design with respect to the connector axis (43), can be detachably plugged into one another along the connector axis (43) and can be locked in the plugged-in state. A locking mechanism (19, 20, 32, 33, 36, 46), which is equipped with a latch function and which latches automatically during insertion is provided for the purposes of rapid locking.

18 Claims, 7 Drawing Sheets

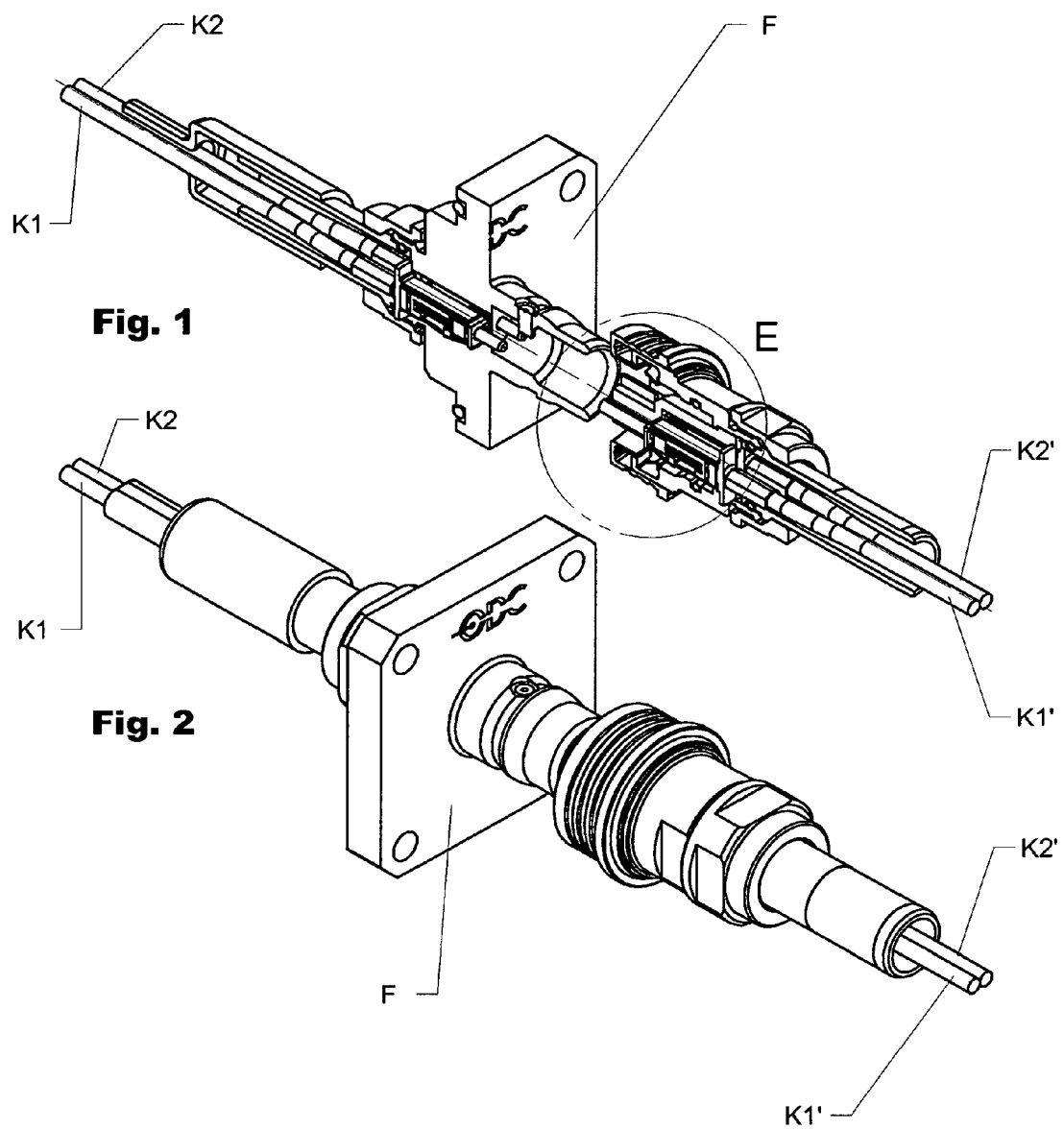

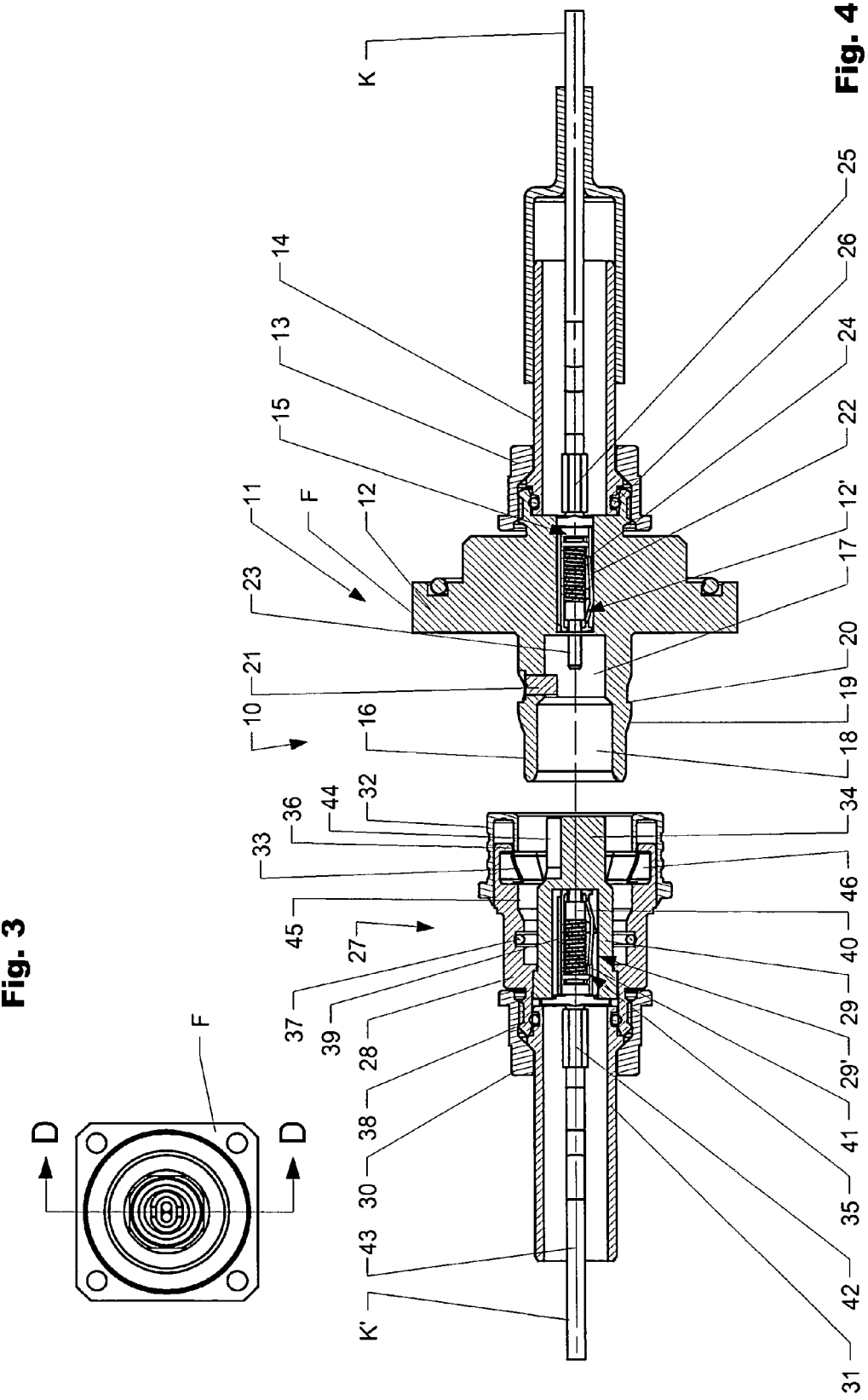

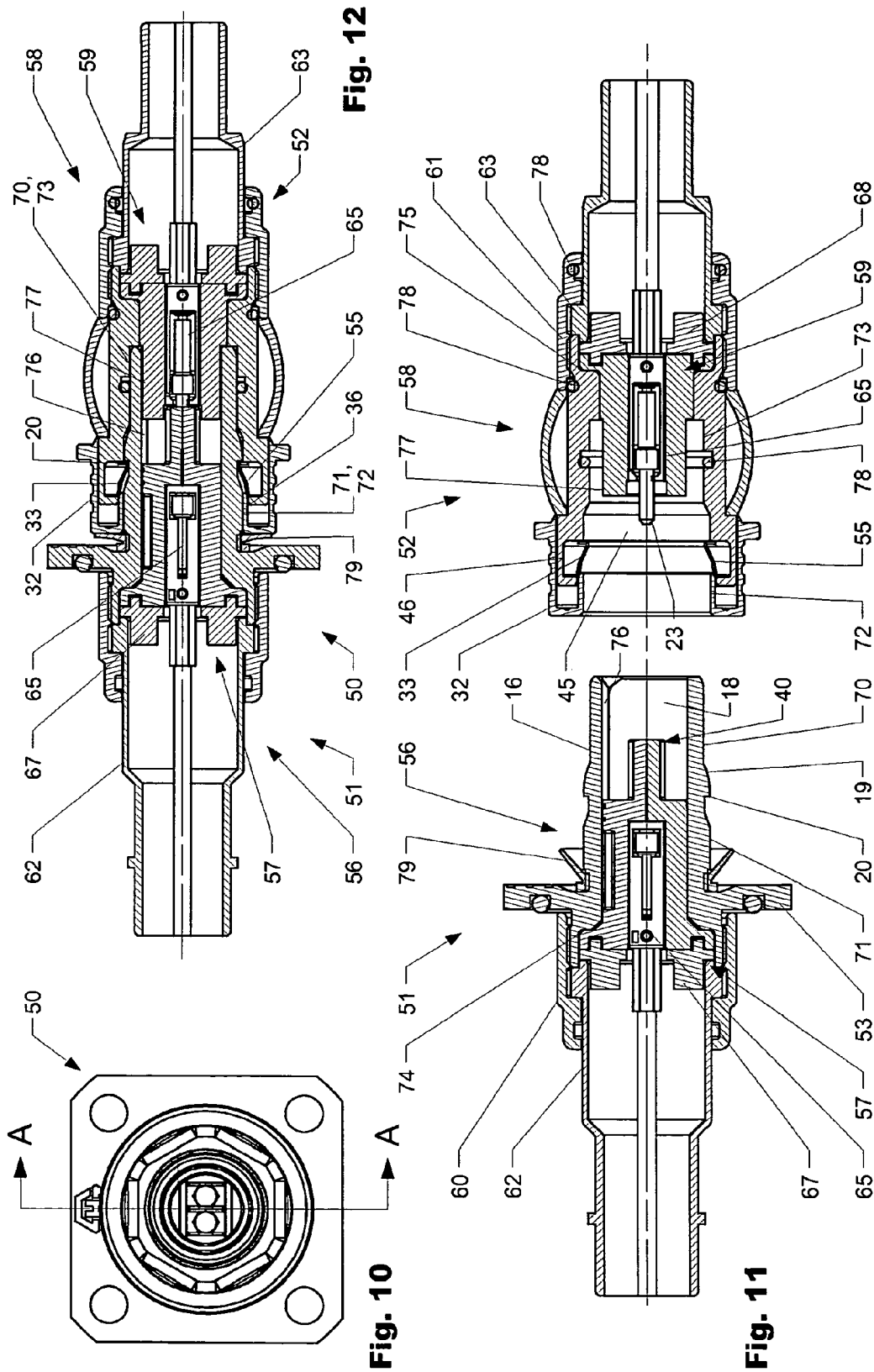

OPTICAL CONNECTOR

BACKGROUND OF THE INVENTION

1. Field of the Invention

The present invention refers to the field of connectors for optical cables. It relates to an optical connector according to the preamble of claim 1.

2. Description of Prior Art

For outside applications, such as in base stations or antennas of mobile radio networks, on ships, for industrial cable and fibre-optic installations or the like, where harsh environmental conditions prevail, optical connectors, which are matched to the particular requirements in terms of application and behaviour, are available under the designation ODC (Outdoor Connector) (see for example the article "ODC—Ein Verbinder für die harten Applikationen" [ODC—A connector for the hard applications] Connectivity News January 2007 (Huber+Suhner), pages 10-11).

In these known connectors, which are designed for a watertight and dust-tight connection of two or four cable pairs and use compact ferrules with an external diameter of 1.25 mm for each optical fibre, and which use prefabricated connector inserts (termini), as are disclosed for example in EP-B1-1 254 387 (see FIGS. 3 and 4 therein), a screw lock in which a union nut attached to a connector portion is screwed onto an external thread arranged on the other connector portion is used for securing the connection in the inserted state. The termini are inserted into and directly held by a robust outer housing of the connector.

Such a screw lock has various disadvantages, however:

- The reliability of the lock is limited because the screw connection can be released if vibrations or the like occur. In particular, the quality of the screw connection depends on whether the union nut is screwed correctly onto the thread; consequently, mounting defects can arise.
- The screw lock requires a significant outlay in terms of time, which is of particular consequence if a large number of optical connections must be produced at one location.
- Specific tools (e.g. torque wrench) which cause additional costs and organizational outlay are necessary for the correct screw connection with predefined tightening torque.
- In order to provide tools with sufficient access to the screw connection, the minimum distance between neighbouring connections must be chosen to be large enough for the achievable connector density to be limited thereby.
- The screw connection results in abrasion on the threads, which can have a negative effect on the very sensitive optical connection. Furthermore, a corrosion-protection coating applied to the connector can be removed.
- The screw connection causes the connector to be loaded with a high torque, which must be absorbed by a means of protection against rotation and deteriorates the rotary (polar) orientation in the circumferential direction.

On the other hand, it has long been known in the field of electric connectors, in particular for coaxial lines, to use quick-release locks, which operate with a locking ring which latches, when inserted into an annular groove, on the counterpart and can be released again by means of a specific actuating element (see for example DE-A1-2 353 004 or EP-A1-0 491 626). Similar quick-release locks have also been used in flexible-tube connections for a long time.

However, optical connections differ from (coaxial) electric connections or flexible-tube connections by virtue of an essential feature: the ends (usually supported in specific ceramic ferrules) of the optical fibres to be connected bluntly strike each other during the connection process, whereas a gliding contact connection or line connection occurs in the electric or flexible-tube connections.

Optical connectors are compared to coaxial electrical connectors a completely different class of connectors, which need to fulfil different criteria: One major aspect is the need that the optical fibres arranged inside of the connector must coaxially match with each other in a very limited tolerance. In difference to, for example, a connector for a coaxial cable, having a centre core and an outer shield to be interconnected at minimum electromagnetic disturbance, an optical connector must guarantee that the one or more single optical wires are interconnected to each other frontal (face to face). Thereby the connection must be guaranteed at different temperature levels, humidity, vibrations and outside influences upon the outer casing of the connector such as pulling on the cable, etc. A further issue is, that these connectors must fulfil certain limitations with respect to dimensions often caused by historical standards. Thereby the space available is very limited. E.g. it must be possible to insert the connectors into bores, which have a given diameter and spacing.

SUMMARY OF THE INVENTION

It is an object of the invention to provide an optical connector, which avoids the disadvantages associated with a screw lock and is distinguished by a simple construction and operation with high functional reliability.

It is a further object of the invention to provide a quick release fastener for more then one optical wire.

It is a further object of the invention to provide an improved connector insert (termini) for an optical cable suitable to be used in connection with an optical connector according to the present invention.

It is a further object of the invention to provide an optical connector which provides a long live span for an optical connection.

A connector according to the invention in general comprises a first and a second connector portion, which are interconnectable with respect to each other.

One essence of the invention consists in providing a locking mechanism, which is equipped with a latch function and which latches automatically during insertion when the first and the second connector portion are interconnected to each other for the purposes of rapid locking. Specific tools can be dispensed, since the latching is effected automatically. At the same time, the distance between neighbouring connectors can be reduced because no additional space for the use of tools is necessary. Since the connection latches automatically when inserted and the locking can be effected, and also released again, easily and rapidly, a connection can be effected about 10 times faster than in a conventional screw lock. Finally, there are no stresses due to abrasion or the like caused by the screw connection.

An embodiment of the connector according to the invention is distinguished in that the locking mechanism comprises an elastically expandable locking ring, which is arranged concentrically with the connector axis. The locking ring is arranged in one of the two connector portions in a fixed position in the axial direction and latches, for locking purposes, behind a peripheral latching step on the other one of the two connector portions during insertion, and in that an actuating element, by means of which the locking ring can be lifted, by elastic expansion, over the latching step for unlocking purposes, is arranged on one of the two connector portions. The locking ring ensures locking, which is uniform over the circumference and counteracts any undesired edging of the connector portions. At the same time it saves space and is optimally matched to the rotationally symmetrical construction of the connector. The locking ring is foreseen to carry and uniformly distribute load in axial direction which results from the frontal interaction of the ferrules of the optical cables. The locking mechanism is designed such that the interaction is not time related in a negative manner, that is interaction does not fade over time.

A development of this embodiment is characterized in that the actuating element is an unlocking sleeve, which is concentric with the connector axis, in that the unlocking sleeve is supported on the associated connector portion such that it can be displaced in the axial direction, in that the unlocking sleeve has an actuating portion, which engages, during unlocking, with the locking ring for elastically expanding the same, and in that the actuating portion is designed as an unlocking ring, which is arranged concentrically with the connector axis and is integrally shaped with the unlocking sleeve. The unlocking sleeve can be operated easily and safely by hand and ensures elastic expansion, which is uniform over the circumference, of the locking ring using the integrally shaped unlocking ring.

According to another embodiment of the invention, the connector is designed for the pairwise connection of more than two optical cables. Depending on the field of application, e.g. four, six or eight optical cables (other numbers may be applicable) are connected to each other pairwise. In a preferred embodiment the fibres of the optical cables are arranged in a special housing of the connector portions one next to each other in a spring loaded manner held by improved connector inserts acting as termini. Because the very limited space available, the holding means are designed such that they can be arranged next to each other in a very space saving manner. The holding frames are therefore reduced to the minimum necessary to hold the optical fibres in place. A further improvement results from the simplified setup compared to the termini known from prior art.

The improved connector inserts allow the exact positioning of the optical fibres in one single or several parallel rows. An improved optical insert according to the present invention in general comprises a holding frame having in principle the shape of a rectangular parallelepiped with a certain length, which is higher than the width and the depth. The width and the depth are approximately similar to each other. The holding frame encompasses an inner space (compartment) in which an optical fibre is arranged in length direction and which is limited by the two smaller opposite end surfaces of the parallelepiped determined by the width and the depth. Each of these end surfaces comprises an opening. The rear opening (in the direction where the optical fibre enters) is suitable to receive a fixing means, e.g. in form of a crimping neck, to attach a cable jacket of an optical cable to the holding frame. The rear opening may be laterally open (slit) such that the fixing means can be inserted from the side. In a preferred embodiment the fixing means (crimping neck) has a thickened flange like front section and is inserted from the direction of the inner space into the rear opening. The fixing means is preferably made out of metal having an axial symmetric, easy to make design, which significantly reduces the cost of production, e.g. compared to a press-in approach as known from the prior art. In a mounted position, a jacket element is arranged inside the compartment of the inner space. The jacket element is rigidly attached onto the optical cable and forms the transition between a flexible jacket layer surrounding and protecting the optical fibre and a rigid ferrule normally made out of ceramic material. Behind the jacket element a spring is arranged in a compressed manner, pressing the jacket element in the direction of the front end of the inner space of the holding frame. The spring is at the rear end supported by the rear end wall holding frame surrounding the rear opening. In a preferred embodiment the spring sits with its rear end on the thickened flange of the crimping neck, thereby pressing the crimping neck against the rear end of the holding frame and holding it inside the rear opening of the holding frame. The front opening is normally lateral open such that the optical fibre can be inserted laterally after it has been inserted in the rear opening. The front opening is normally designed such that it is narrower than the width and the depth of the inner space forming a shoulder against which the jacket element is pressed by the spring.

The holding frame of the connector insert is made out of injection molded plastic material. Compared to the termini of the prior art, the complicated geometry is integrated into the holding frame thereby significantly reducing the cost.

In a preferred embodiment the holding frame comprises laterally wing like elements protruding on opposite sides laterally above the side wall of the holding frame. The wing like elements are preferably integrally shaped in one piece with the holding frame. The holding frame is preferably made out of injection molded plastic material. In another embodiment, the holding frame comprises more than one compartment, e.g. arranged back to back or next to each other. Each compartment is thereby suitable to receive an optical fibre in the above described manner. If appropriate, holding frames with one or two rows of back to back arranged compartments can be realized.

Several optical fibres can be arranged loosely or interconnected to each other, next to each other or in a square. E.g. in one embodiment two optical fibres are arranged, one next to the other, or four optical fibres arranged in the form of a square, are accommodated in the connector portions.

Another embodiment is characterized in that the connector has means for fixing the rotary position of both connector portions with respect to one another. These means are preferably arranged such that they do not fix the rotary position until the two connector portions are already adjusted in line with one another in terms of their axes during the insertion process.

The means for fixing the rotary position preferably comprise a radial or axial guide pin, which is attached to a connector portion and engages in an axial guide groove or axial guide hole on the other connector portion during insertion.

Another development of the invention is characterized in that the unlocking sleeve is arranged on the same connector portion as the locking ring, and in that in particular the locking ring and the unlocking sleeve are arranged on the plug portion.

It is furthermore advantageous if the plug portion comprises a housing, which is hollow-cylindrical in relation to the connector axis and in which a cylindrical plug body is fixedly arranged concentrically, with the formation of an annular interspace, if the socket portion has a socket section, which is hollow cylindrical in relation to the connector axis and which moves into the interspace at the plug portion during insertion and receives the plug body inside itself when the latching step is arranged on the outside of the socket section, when the locking ring is supported in a concentric annular groove on the inside of the housing of the plug portion and when the unlocking sleeve encloses the housing of the plug portion externally and protrudes with the actuating portion into the interspace between housing and plug body. In order to increase the imperviousness or tightness, a seal may be provided, which comes to bear between the housing of the plug portion and the socket section when the connector is plugged together.

In order to simplify the insertion process, it is possible, in particular, to form a bevelled peripheral shoulder for elastically expanding the locking ring in front of the latching step on the outside of the socket section in the insertion direction.

Insertion can be further simplified if the inside of the socket section and the outside of the plug body are provided with a mutually matched diameter gradation.

Another embodiment is distinguished in that in the socket portion and in the plug portion for each of the optical cables to be connected a connector insert is foreseen, having a ferrule, which is supported in a resilient manner in a frame in the axial direction, with the ferrule receiving the end of the optical fibre of the respective optical cable, in that the connector inserts are inserted in receiving spaces provided therefore in the socket body and in the plug body, wherein the ferrules of the connector inserts in the socket portion protrude freely into the internal space of the socket section and the ferrules of the connector inserts in the plug portion protrude into a coupling section, which is formed at the front face of the plug body for the alignment of the associated ferrules in socket portion and plug portion in line with one another.

BRIEF DESCRIPTION OF THE DRAWINGS

The herein described invention will be more fully understood from the detailed description given herein below and the accompanying drawings which should not be considered limiting to the invention described in the appended claims. The drawings are showing:

FIG. 1 shows in a cut-open illustration a first embodiment of an optical connector for connecting two optical cable pairs with socket portion and plug portion according to a preferred exemplary embodiment of the invention in the unplugged state;

FIG. 2 shows the connector according to FIG. 1 in an uncut illustration;

FIG. 3 shows the connector according to FIG. 1 in an axial view of the socket portion;

FIG. 4 shows the longitudinal section through the connector according to FIG. 1 in the plane D-D shown in FIG. 3, with the sides being interchanged with respect to FIG. 1;

FIG. 10 shows a front view of the connector according to FIG. 8;

FIG. 11 shows a cross section of the connector in an unplugged condition;

FIG. 12 shows a cross section of the connector in a plugged condition;

DETAILED DESCRIPTION OF THE INVENTION

Figure 5:
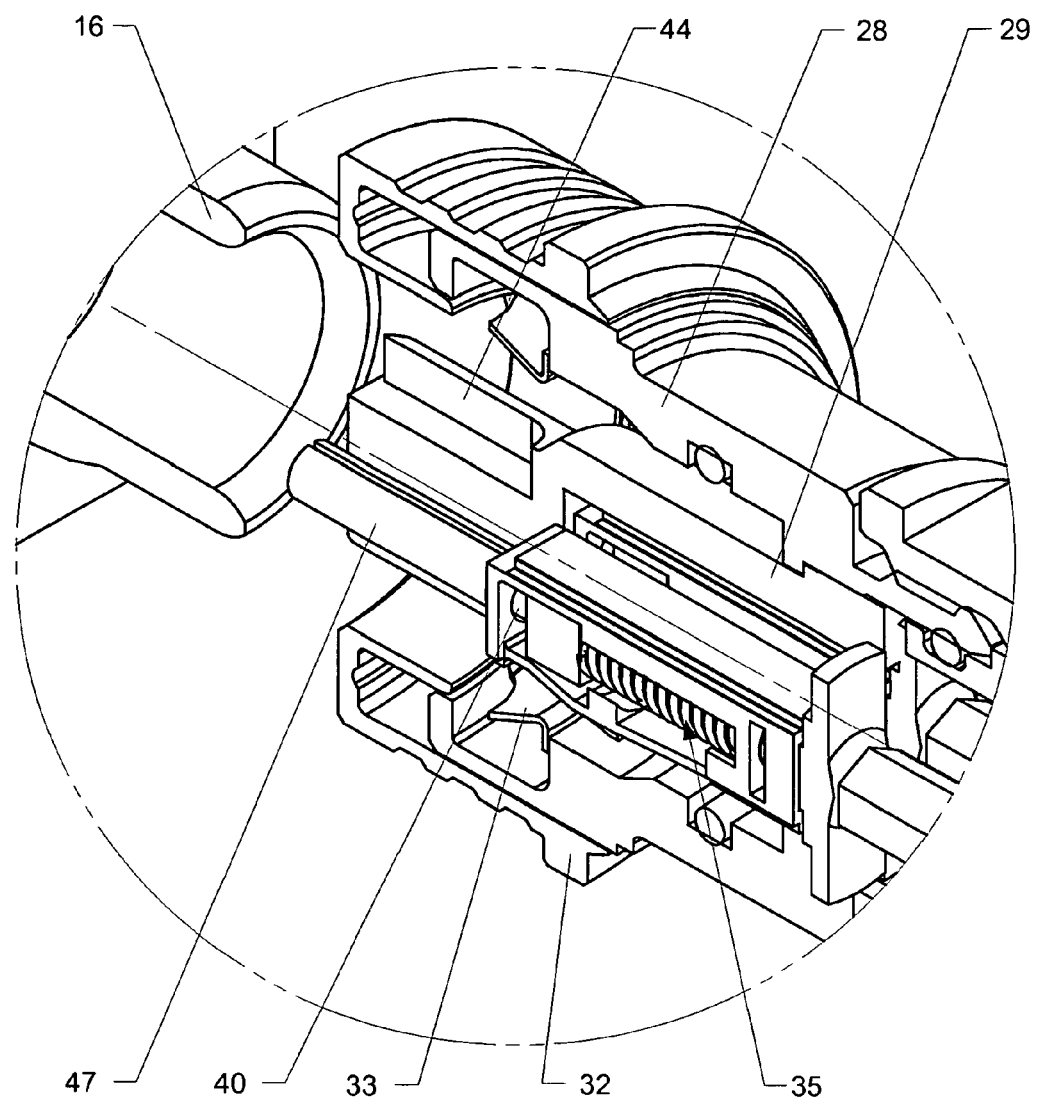
FIG. 5 shows the enlarged section E drawn in FIG. 1.

FIGS. 1 to 5 reproduce an optical connector according to a preferred exemplary embodiment of the invention, in various types of illustration in the unplugged state. The connector 10 comprises two connector portions, to be precise a socket portion 11 and a plug portion 27. The two connector portions 11, 27 which can be detachably plugged together along a connector axis 43, substantially have (except for a square flange F on the socket portion 11) a cylindrical design in relation to the connector axis 43.

Figure 6:
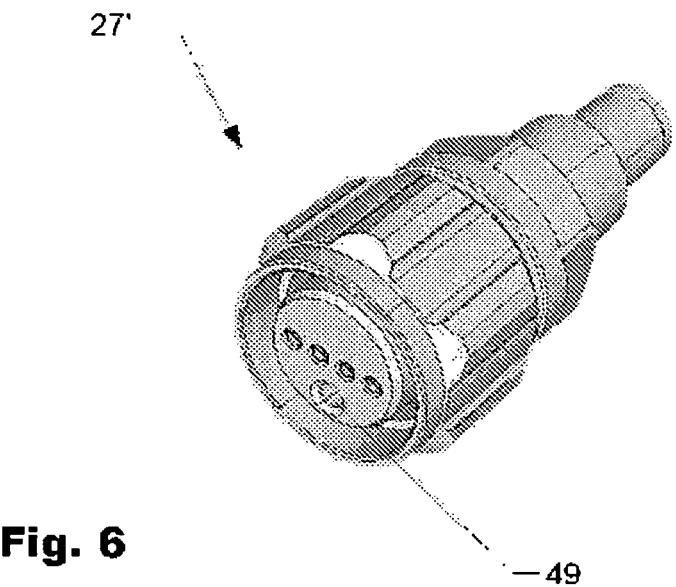
FIG. 6 shows a perspective illustration of the plug portion of a second embodiment of an optical connector (without the locking mechanism being illustrated) for connecting four cable pairs, with the mechanical interface being implemented by an eccentric axial pin and an associated axial hole.
Figure 7:
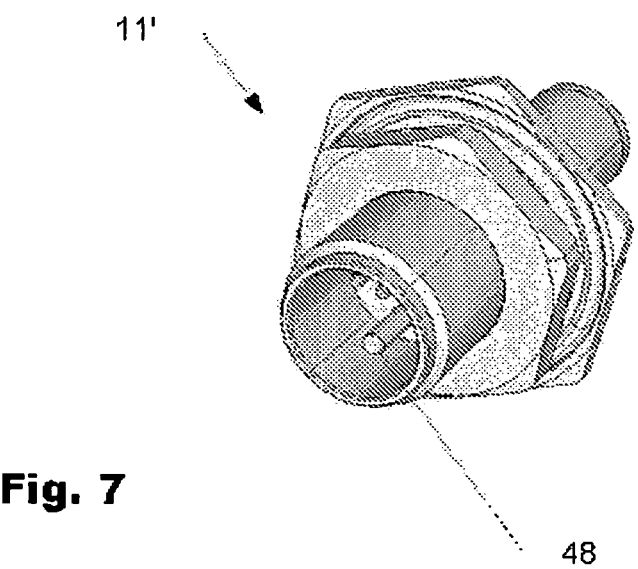
FIG. 7 shows a perspective illustration of the socket portion associated with the plug portion as shown in FIG. 6.

The socket portion 11 comprises a (cylindrical) socket body 12 with integrally attached flange F (but which may also be omitted or made as a separate part) to which a connecting part 14 can be connected at the rear face by means of a union nut 13, with the connecting part enclosing the optical cables K or K1, K2 inserted into the socket portion 11 and being sealed off with respect to the socket body 12 by a first O-ring-shaped seal 26. At the front face, the socket body 12 merges into a hollow-cylindrical socket section 16 which is used for centring and rotatively positioning the connector portions 11, 27 during insertion and carries elements of the locking mechanism. Inside the socket body, a receiving space 12' receiving at least one, here conventional connector insert 15 (termini) and extending in the axial direction (as is known, for example, from EP-B1-1 254 387 mentioned in the introduction) is provided. A ferrule 23 is supported in a spring loaded resilient manner by means of a compression spring 24 in the connector insert 15 in a laterally open frame 22. The end of the glass fibre to be connected is adhesively bonded in a manner, which is known per se into a central through-hole in the ferrule 23. The connector inserts 15 are distinguished by virtue of minimal external dimensions and are designed such that they can be placed one next to the other without interspaces. In a connector of the type described herein, two, three, four or more of such connector inserts (ferrule holders) 15 can be arranged for this reason one next to the other in a narrow space in order to implement a compact connector, which is easy to install and operate. In the example of FIGS. 1 to 5, two connector inserts 15 are arranged one next to the other. In the example of FIGS. 6 and 7, four connector inserts one next to the other are used. The ferrule 23 here protrudes freely into the first of two axial holes 17, 18 of the socket section 16, with the internal diameters of the holes being gradated and the holes receiving, during insertion, a plug body 29 of the plug portion 27, which is gradated in the same manner. A peripheral latching step, which has arranged upstream of it a peripheral bevelled shoulder 19 is formed on the outside of the socket section 16 in the region of the diameter step between the holes 17, 18. During insertion, a locking ring 33 arranged at the plug portion 27 is elastically expanded at the shoulder 19 and then latches in a locking manner behind the latching step 20. A guide pin 21 protrudes radially from the outside into the hole 17 at the socket section 16, engages during insertion in an axial guide groove 44 at the front section of the plug body 29 and positions the two connector portions 11, 27 rotatively with respect to one another. The guide pin 21 and the guide groove 44 do not engage until socket section 16 and plug body 29 are already aligned axially in line with one another. At the same time, the guide pin 21 prevents the coupling section 34 of the plug body 29 from striking the ferrules 23 and from damaging them (run-up protection) if the connector portions are aligned incorrectly in terms of rotation with respect to one another.

The plug portion 27 comprises an external (hollow-cylindrical) housing 28 in which the cylindrical plug body 29 is fixedly arranged concentrically with the formation of an annular interspace 45. The socket section 16 of the socket portion 11 moves into the interspace 45 during insertion and simultaneously receives the plug body 29 inside it. The plug body 29 here acts as an inner housing for the connector inserts 35. The locking ring 33, which has an in general L-shaped cross-section and which conically tapers towards the rear is supported on the inside of the housing 28 in a concentric annular groove 46.

An unlocking sleeve 32 externally encloses the housing 28 of the plug portion 27 at the front section. Depending on the field of application, the locking ring 33 is slit or equipped with flexible tongues, which can be lifted away from the latching step 20 via the unlocking sleeve 32. The unlocking sleeve 32 protrudes by an actuating portion in the form of an unlocking ring 36 into the interspace 45 between housing 28 and plug body 29. If the unlocking sleeve 32 is pushed towards the rear (to the right in FIG. 1), the unlocking ring 36 presses from the inside against the oblique flank of the locking ring 33 and elastically expands it. If the locking ring 33 is latched in the plugged-in state behind the latching step 20, the locking ring 33 can thus be lifted over the latching step 20 and the connector 10 can be unlocked.

A receiving space 29' for at least one connector insert 35 is likewise provided in the plug body 29 and has a ferrule 40, which is supported in a resilient manner by means of the compression spring 41 in a frame 39. The ferrule 40 protrudes into a coupling section 34, which is integrally moulded with the front of the plug body 29 and—coming from the other side—also receives the other ferrule 23 during insertion and thus aligns both ferrules 23, 40 in line with one another by means of a guide sleeve 47 (FIG. 5), which is arranged in corresponding holes. If the connector 10 connects four optical cables in total in a pair-wise manner, in each case two connector inserts 15 and 35 are arranged one next to the other (FIGS. 1, 5) in each connector portion 11, 27.

A connecting portion 31 is attached on the rear face of the housing 28 by means of a union nut 30, encloses the optical cable K' or KV, K2' inserted into the plug portion 27 and is sealed off with respect to the housing 28 by means of a second O-ring-shaped seal. A further annular seal 37, which comes to bear between the housing 28 of the plug portion 27 and the socket section 16 when the connector 10 is plugged together and seals off both with respect to each other, is arranged on the inside of the housing 28. Sleeve-type connecting portions 25, 42 are provided on the rear faces of the connector inserts 15, 35 and serve as attachment means and bend protection for the respective optical cable K, K' or K1, K2, KV, K2.

In the exemplary embodiment, described so far using the figure of the connector according to the invention, the guide pin 21 in the socket section of the socket portion 11 and the axial guide groove 44 in the plug body 29 of the plug portion 27 form a mechanical interface which has the following functions:

protection against rotation;
polar or rotary orientation of the two connector portions 11, 27 with respect to one another;
absorption of torques; and
run-up protection (for the unobstructed ferrules).

The radial alignment of the connector portions 11, 27 is effected by the socket section 16 and the plug body 29.

These functions can, however, also be divided differently: for example, the socket section and the plug body can in each case have a polygonal (e.g. hexagonal) cross section, which is mutually matched. Socket section and plug body then directly perform the protection against rotation, the polar (rotary) orientation and the torque absorption. The only thing then needed is a run-up protection which, for example, can in turn be performed by a combination of radial pin and axial groove. Such a division of the functions has the advantage that shearing off of the radial guide pin on account of high torques can be avoided reliably. The radial guide pin (21) can otherwise also be replaced by a rib formed on the inside of the socket section 16.

Another possible way of coding is shown in FIGS. 6 and 7, in which for reasons of simplification, the illustration of a locking mechanism is dispensed with. The connector made up of the socket portion 11 of FIG. 7 and the plug portion 27' of FIG. 6 is designed for the connection between four cable pairs. In order to align the two connector portions 11, 27' in line with one another, an axial guide pin 48 is provided in the socket portion 11 and a corresponding axial guide hole 49, into which the axial guide pin 48 moves during insertion, is provided in the plug portion 27'. The axial guide pin 48 projects beyond the unobstructed ferrules and thus serves as run-up protection in the case of incorrect orientation.

Figure 8:
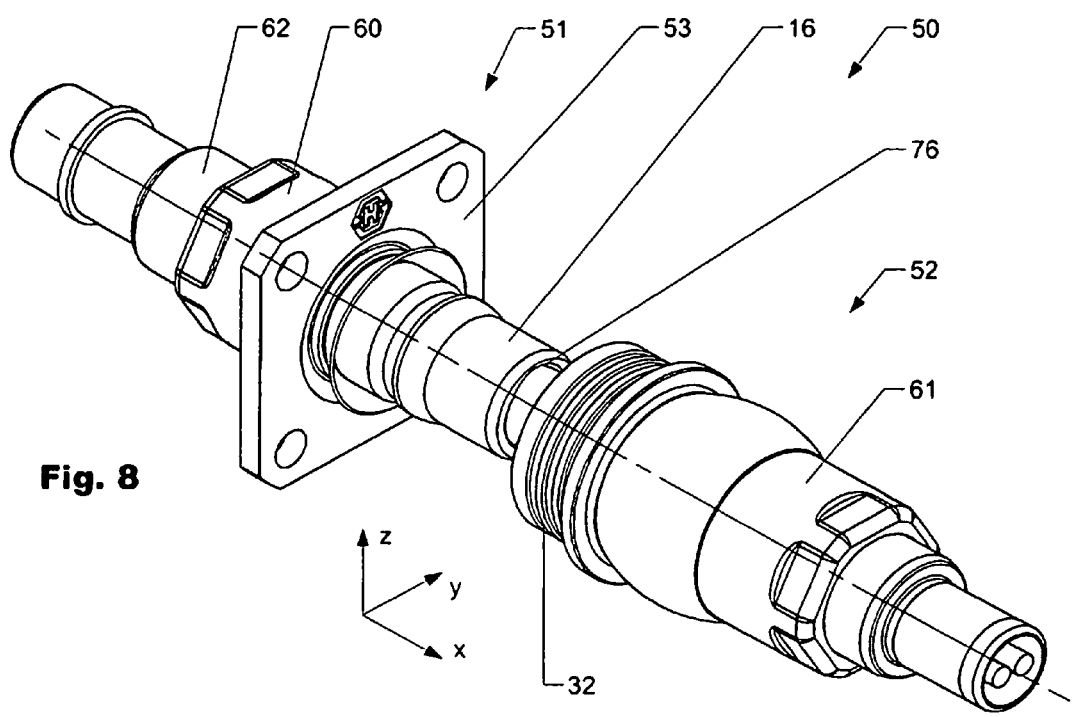
FIG. 8 shows a third embodiment of an optical connector in a perspective manner.
Figure 9:
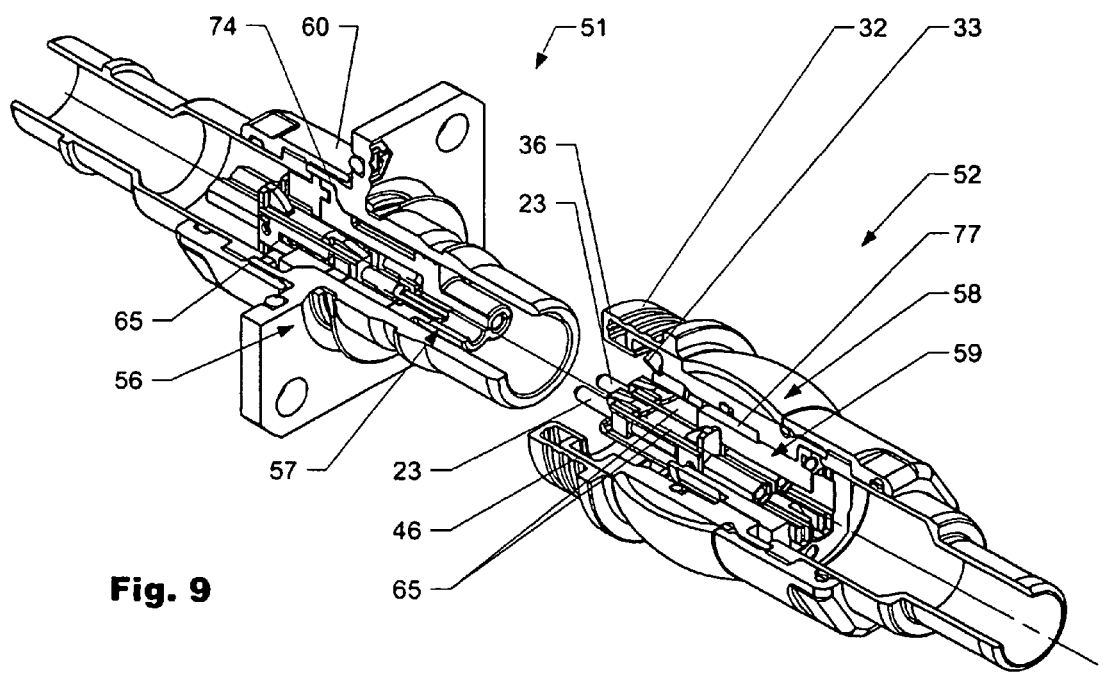
FIG. 9 shows the optical connector in partially cut open view.

FIG. 8 shows a further embodiment of a connector 50 according to the present invention in a perspective manner and FIG. 9 shows the same connector 50 in a partially cut view, such the inside of the connector is visible. FIG. 10 shows the same connector in a front view and FIG. 11 in a section view cut apart along cutting line AA according to FIG. 10. The connector 50 as shown is optimized with respect to limited space available such that it can, e.g. be mounted in existing cases having certain mounting bores.

The connector 50 comprises a socket portion 51 and a plug portion 52, which can be interconnected to each other along a connector axis (x-axis). The two portions 51, 52 are shown spaced apart from each other in a non-connected position. FIG. 12 shows a section view through the connector 50 according to FIG. 10, whereby the socket portion 51 and the plug portion 52 are in an interconnected position.

The socket portion comprises a mounting flange 53 by which it can be attached to a housing (not shown in detail). If appropriate, the mounting flange 53 can be avoided if the connector 50 is to be used in another application. As it can be best seen in connection with FIGS. 11 and 12, the socket portion 51 comprises a multipart outer housing 56 and an inner housing 57 inserted into the outer housing 56 from the rear (cable side). The plug portion 52 here also comprises an outer housing 58 and an inner housing 59, which is inserted from the rear into the outer housing 58. Both inner housings 57, 59 are sitting on a shoulder 74, 75 secured by a first and a second union nut 60, 61 indirectly secured via sleeve-like connecting portions 62, 63.

In the shown embodiment the inner housings 57, 59 are foreseen to receive two connector inserts 65 (depending on the field of application other numbers are possible) arranged adjacent and next to each other. Details of the connector inserts 65 can be seen along with FIG. 13. The connector inserts 65 are secured by bushings 67, 68 from the rear via the sleeve-like connecting portions 62, 63.

With respect to the principle functionality of the quick release mechanism it is in general referred to the explanations given along with the connector 10 according to the FIGS. 1 through 5. Corresponding reference signs are used.

The cylindrical plug body 59 (inner housing) is fixedly arranged concentrically with the formation of an annular interspace 45. During insertion the socket section 16 of the socket portion 51 moves into the interspace 45 and simultaneously receives the plug body 59 inside it. The locking ring 33, which has an in general L-shaped cross-section and which conically tapers towards the rear is supported on the inside of the housing 28 in a concentric annular groove 46 such that it cannot be moved in a negative manner in x-direction.

An unlocking sleeve 32 externally encloses the outer housing 58 of the plug portion 52 at the front section. Depending on the field of application, the locking ring 33 is slit or equipped with flexible tongues, which can be lifted away from the latching step 20 via the unlocking sleeve 32. The unlocking ring 33 can be made out of plastic or metal. The unlocking sleeve 32 protrudes by an actuating portion in the form of an unlocking ring 36 into the interspace 45 between housing 58 and plug body 59. If the unlocking sleeve 32 is pushed towards the rear (to the right in FIG. 12), the unlocking ring 36 presses from the inside against the oblique flank 55 of the locking ring 33 and elastically expands it. If the locking ring 33 is latched (see FIG. 12) in the plugged-in state behind the latching step 20, the locking ring 33 can thus be lifted over the latching step 20 and the connector portions 51, 52 can be unlocked with respect to each other.

The outer housing 56, 58 of the connector 50 is foreseen to protect the inside of the connector 50 and to guarantee that the optical fibres (not visible) arranged inside the ferrules 23, 40 are securely interconnected frontal to each other independent of the forces acting upon the outer housing 56, 58.

When the socket portion 51 and the plug portion 52 are in a locked position as shown in FIG. 12, interacting with each other, the resulting moments and forces acting around and in the direction of the y- and z-axis are primarily transmitted via the interaction of the close circumferential mating of the outer front and rear surfaces 70, 71 of the outer housing 56 of the socket portion and the inner front and rear surfaces 72, 73 of the outer housing 58 of a plug portion 52. The diameters of these surfaces are chosen such that are pairwise substantially equal to each other providing sufficient lateral support for the mating surfaces when in a connective position. Thereby unwanted lift-off of the optical fibres can be prevented.

In the shown embodiment rotation between the socket portion 51 and the plug portion 52 along the length axis (x-axis) of the connector 50 is primarily prevented by interaction of a notch 76 here arranged at the outer housing 56 of the socket portion 51 with a comb element 77 radially protruding from the inner housing 59 of the plug portion 52. The notch 76 and the comb element 77 are arranged such that they mate with each other before the ferrules 23, 40 are functionally interacting. If appropriate alternative or in additional features can be foreseen, which prevent axial rotation between the connector portions 51, 52 with respect to each other. E.g. it is possible to incorporate special features with the outer housings 56, 58. One advantage of aligning the inner housings 57, 59 with respect to each other is the improved accuracy of the connection which can be achieved. A further advantage is that the outer housing 56, 58 of the connector 50, which is preferably made out of a durable material, such as metal, can be made more simple and thereby more cost efficient. The inner housing 57, 59 of the connector 50 is preferably made out of a material, which can be formed by injection or compression molding. Good results can be achieved by plastic materials or certain types of metal alloys. If appropriate, the inner housings 57, 59 can be arranged at least on one side of the connector 50 floating with respect to the outer housing 56, 58. This can be achieved by a resilient element arranged between the housings. One advantage can be that the lower tolerances of the outside housings can be compensated.

The forces between the connector portions 51, 52 in length direction (x-axis) are transferred via locking ring 33, which securely prevents any negative movement in said direction. In difference to a coaxial connector as known from prior art the relative movement must be kept below a certain more critical level. Therefore the parts of the connector portions 51, 52 must be dimensioned accordingly.

To prevent humidity and dirt to enter between the interacting connector portions 51, 52 o-ring shaped seals 78 are arranged in the critical areas. A conically shaped front seal 79 made of a rubber-like material interacts with the unlocking ring 36.

The procedure to assemble a connector portion 51, 52 of the connector 50 in general takes place as follows:
  Insert at least one connector insert into an inner housing of a connector portion 51, 52;
  Enter the connector insert into the outer housing 56, 58 of a connector portion 51, 52;
  Securely fasten the inner housing 57, 59 inside the outer housing 56, 58.

Figure 13:
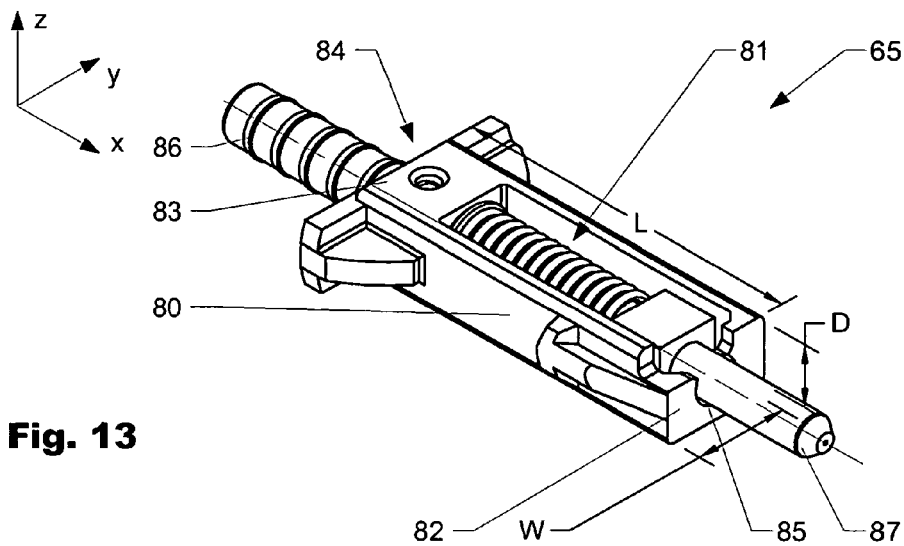
FIG. 13 shows in a perspective manner an improved version of a connector insert.
Figure 14:
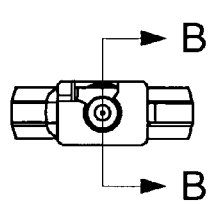
FIG. 14 the connector insert according to FIG. 13 in a front view.
Figure 15:
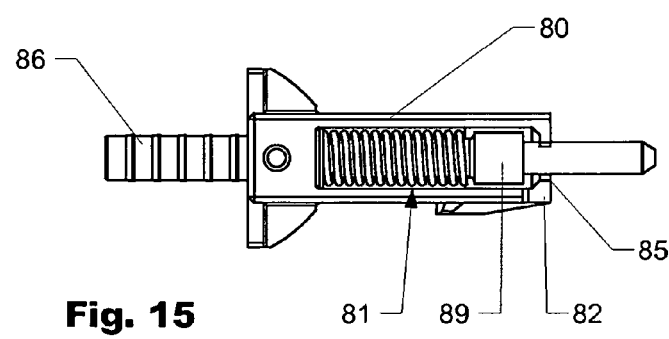
FIG. 15 the connector insert in a top view.
Figure 16:
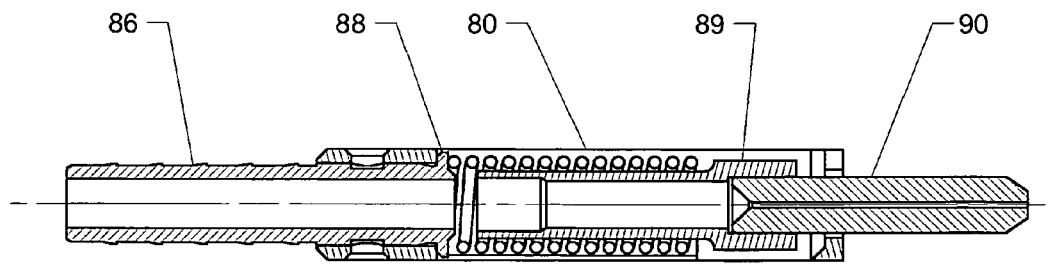
FIG. 16 the connector insert in a section view along line BB of FIG. 14.

FIG. 13 shows an improved version of a connector insert 65 according to the present invention in a perspective manner. The connector insert is shown without an optical cable. FIG. 14 is showing the connector insert in a front view, FIG. 15 in a top view and FIG. 16 shows a sectional view along line BB of FIG. 14.

An improved connector insert 65 according to the present invention in general comprises a holding frame 80 having in principle the shape of a rectangular parallelepiped with a certain length (L) which is higher then the width (W) and the depth (D). The width and the depth are approximately similar to each other. The holding frame 80 encompasses an inner space (compartment) 81 in which an optical fibre is arranged in length direction (x-direction) and which is limited by the two smaller opposite end sections 82, 83 of the parallelepiped determined by the width and the depth. Each of these end sections 82, 83 comprises an opening 84, 85. The rear opening 84 (in the direction where the optical fibre enters) is suitable to receive a fixing means 86, e.g. in form of a crimping neck, to attach a cable jacket of an optical cable (both not shown) to the holding frame 80. The rear and/or the front opening 84, 85 may be laterally open (slit) such that the fixing means 86 and/or the ferrule 90 can be inserted from the side. As it can be seen in FIG. 16 the shown embodiment of the fixing means 86 has a thickened flange-like front section 88 and is inserted from the direction of the inner space into the rear opening 84. The bushing like fixing means 86 is preferably made out of metal having an axial symmetric, having an easy to make design which significantly reduces the cost of production, e.g. compared to a press-in approach as known from the prior art. In a mounted position a jacket element 89 is arranged inside the compartment of the inner space. The jacket element is rigidly attached onto an optical cable (not shown in detail) arranged at the inside and forms the transition between the optical cable and a rigid ferrule 90 normally made out of ceramic material. Behind the jacket element 89 a spring 91 is arranged in a compressed manner pressing the jacket element in the direction of the front section 83 of the holding frame 80. The spring 91 is at the rear end supported by the rear end section 82. In the shown embodiment the spring sits with its rear end on the thickened flange 88 of the crimping neck 86, thereby pressing the crimping neck against the rear end of the holding frame and holding it inside the rear opening of the holding frame 80. The front opening is normally laterally open such that the ferrule 90 fibre can be inserted laterally after it has been inserted in the rear opening. The front opening normally is designed such that it is narrower than the width and the depth of the inner space forming a shoulder against which the jacket element 89 is pressed by the spring 91.

The invention claimed is:

1. An optical connector (10) for detachably frontal connecting at least two optical cables along a connector axis (43), comprising:
   a socket portion (11) and a plug portion (27), which portions are substantially of cylindrical design with respect to the connector axis (43), wherein the socket portion and the plug portion are detachably plugged into one another along the connector axis (43, x) and are lockable in the plugged-in state, wherein a locking mechanism (19, 20, 32, 33, 36, 46), equipped with a latch function and which latches automatically during insertion, is provided for the purposes of rapid locking;
   wherein the socket portion (11) and the plug portion (27) each include a plurality of plug inserts (15, 35) arranged one next to an other without interspace, each of the plug inserts (15, 35) including a ferrule (23, 40) supported in a resilient manner within a frame (22, 39) in the axial direction, the plug inserts (15, 35) provided for the optical cables which are to be connected to one another, with each ferrule receiving an end of an optical fiber of a respective optical cable; and
   wherein the locking mechanism (19, 20, 32, 33, 36, 46) comprises an elastically expandable locking ring (33), which is arranged concentrically with the connector axis (43), which is supported in an axially fixed position in a concentric annular groove (46) in one of the socket portion (11) and the plug portion (27), and latches, for locking purposes, behind a peripheral latching step (20) on the other one of the socket portion (11) and the plug portion (27) during insertion, and in that an actuating element (32), by means of which the locking ring (33) can be lifted over the latching step (20) for unlocking purposes, is arranged on one of the socket portion (11) and the plug portion (27).

2. The optical connector according to claim 1, wherein the locking ring (33) comprises a generally L-shaped cross-section.

3. The optical connector according to claim 1 wherein the actuating element comprises an unlocking sleeve (32), which is concentric with the connector axis (43), in that the unlocking sleeve (32) is supported on the associated connector portion (11, 27) of the optical connector (10) such that it can be displaced in the axial direction, and in that the unlocking sleeve (32) has an actuating portion (36) which engages, during unlocking, with the locking ring (33) for elastically expanding the same.

4. The optical connector according to claim 3 wherein the actuating portion comprises an unlocking ring (36), which is arranged concentrically with the connector axis (43) and is integrally molded with the unlocking sleeve (32).

5. The optical connector according to claim 1 wherein the connector (10) is designed for the pair-wise connection of four, six or eight optical cables.

6. The optical connector according to claim 1 wherein the connector (10, 50) further comprises means (21, 44, 48, 49, 76, 77) for fixing the rotary position of both connector portions (11, 27, 51, 52) of the optical connector (10) with respect to one another.

7. The optical connector according to claim 6, wherein the means for fixing the rotary position comprise at least one of a radial guide pin 21 and an axial guide pin 48, which is attached to a connector portion (11) of the optical connector (10) and engages in an axial guide groove (44) or axial guide hole (49) on the other connector portion (27) of the optical connector (10) during insertion.

8. The optical connector according to claim 3, wherein the unlocking sleeve (32) is arranged on the same connector portion (11, 27) of the optical connector (10) as the locking ring (33).

9. The optical connector according to claim 8, wherein the locking ring (33) and the unlocking sleeve (32) are arranged on the plug portion (27).

10. The optical connector according to claim 8, wherein the plug portion (27) comprises a housing (28), which is hollow-cylindrical in relation to the connector axis (43) and in which a cylindrical plug body (29) is fixedly arranged concentrically, with the formation of an annular interspace (45), in that the socket portion (11) has a socket section (16), which is hollow-cylindrical in relation to the connector axis (43) and which moves into the interspace (45) at the plug portion (27) during insertion and receives the plug body (29) inside itself, in that the latching step (20) is arranged on the outside of the socket section (16), in that the locking ring (33) is supported in a concentric annular groove (46) on the inside of the housing (28) of the plug portion (27), in that the unlocking sleeve (32) externally encloses the housing (28) of the plug portion (27) and protrudes with the actuating portion (36) into the interspace (45) between housing (28) and plug body (29).

11. The optical connector according to claim 10, wherein a bevelled peripheral shoulder (19) for elastically expanding the locking ring (33) is formed in front of the latching step (20) on the outside of the socket section (16) in the insertion direction.

12. The optical connector according to claim 10 wherein the inside of the socket section (16) and the outside of the plug body (29) are provided with a mutually matched diameter gradation.

13. The optical connector according to claim 1, wherein the plug inserts (15, 35) are inserted in receiving spaces (12', 29') provided therefore in the socket body (12) and in the plug body (29), wherein the ferrules (23) of the plug inserts (15) in the socket portion (11) protrude freely into the internal space (17, 18) of the socket section (16) and the ferrules (40) of the plug inserts (35) in the plug portion (27) protrude into a coupling section (34), which is formed at the front face of the plug body (29) for the alignment of the associated ferrules (23, 40) in socket portion (11) and plug portion (27) in line with one another.

14. The optical connector according to claim 10, wherein a seal (37) is created between the housing (28) of the plug portion (27) and the socket section (16) when the connector (10) is plugged together.

15. The optical connector according to claim 6, wherein the socket section and the plug body in each case have a mutually matched polygonal cross section.

16. The optical connector according to claim 1 wherein the socket and/or the plug portion comprise an inner and an outer housing whereby the inner housing is suitable to receive at least one connector insert.

17. The optical connector according to claim 16, wherein at least one of the inner housings is arranged floating with respect to the corresponding outer housing.

18. An optical connector (10) for detachably frontal connecting at least two optical cables along a connector axis (43), comprising:
   a socket portion (11) and a plug portion (27), which portions are substantially of cylindrical design with respect to the connector axis (43), wherein the socket portion and the plug portion are detachably plugged into one another along the connector axis (43, x) and are lockable in the plugged-in state, wherein a locking mechanism (19, 20, 32, 33, 36, 46), equipped with a latch function and which latches automatically during insertion, is provided for the purposes of rapid locking;

wherein the locking mechanism (19, 20, 32, 33, 36, 46) comprises an elastically expandable locking ring (33), which is arranged concentrically with the connector axis (43), which is supported in an axially fixed position in a concentric annular groove (46) in one of the socket portion (11) and the plug portion (27), and latches, for locking purposes, behind a peripheral latching step (20) on the other one of the socket portion (11) and the plug portion (27) during insertion, and in that an actuating element (32), by means of which the locking ring (33) can be lifted over the latching step (20) for unlocking purposes, is arranged on one of the socket portion (11) and the plug portion (27); and wherein at least one of the socket portion (11) and the plug portion (27) includes a plurality of plug inserts (15, 35) aligned one next to an other in one plane across the at least one of the socket portion (11) and the plug portion (27), each of the plug inserts having a ferrule (23, 40) supported in a spring resilient manner within a frame by a compression spring (24) in the axial direction for receiving an end of an optical fiber of one of the optical cables.

* * * * *